US007405648B2

(12) United States Patent
Hatemata

(10) Patent No.: US 7,405,648 B2

(45) Date of Patent: Jul. 29, 2008

(54) REMOTE CONTROL WIRING MECHANISM

(75) Inventor: Takeshi Hatemata, Kadoma (JP)

(73) Assignee: Matsushita Electric Works, Ltd., Osaka (JP)

( * ) Notice: Subject to any disclaimer, the term of this patent is extended or adjusted under 35 U.S.C. 154(b) by 407 days.

(21) Appl. No.: 11/157,960

(22) Filed: Jun. 22, 2005

(65) Prior Publication Data

US 2005/0286196 A1 Dec. 29, 2005

(30) Foreign Application Priority Data

Jun. 25, 2004 (JP) ............................ 2004-188798

(51) Int. Cl.

| | |
|---|---|
| ***G05B 11/01*** | (2006.01) |
| ***G05B 1/08*** | (2006.01) |
| ***H01H 9/00*** | (2006.01) |
| ***H01H 47/00*** | (2006.01) |
| ***H01H 47/26*** | (2006.01) |

(52) U.S. Cl. ............................ 340/310.11; 340/693.1; 340/539.1; 340/539.15; 361/160; 361/191; 361/211

(58) Field of Classification Search ...................... None
See application file for complete search history.

(56) References Cited

U.S. PATENT DOCUMENTS

| | | | | |
|---|---|---|---|---|
| 3,558,902 | A * | 1/1971 | Casey | 307/3 |
| 3,872,319 | A * | 3/1975 | Platzer, Jr. | 307/114 |
| 3,971,028 | A * | 7/1976 | Funk | 307/157 |

FOREIGN PATENT DOCUMENTS

| | | |
|---|---|---|
| JP | 2000-010694 | 1/2000 |

* cited by examiner

*Primary Examiner*—Julie Lieu
(74) *Attorney, Agent, or Firm*—Greenblum & Bernstein, P.L.C.

(57) ABSTRACT

There is provided a remote control wiring mechanism, which makes it easy to construct a system by facilitating a connection work and treatment of members constructing the system. A main unit includes signal terminals connected to signal lines and power supply terminals to supply power for driving a relay. A relay unit having a relay is detachably connected to a relay socket of the main unit and is integrally coupled to the main unit. When a transmission signal including on-off information of a switch is received through the signal lines, the on-off state of the switch is reflected in the switching of the relay.

17 Claims, 11 Drawing Sheets

REMOTE CONTROL WIRING MECHANISM

BACKGROUND OF THE INVENTION

1. Field of the Invention

The present invention relates to a remote control wiring mechanism in which an on-off state of a switch is reflected in the switching of a relay by transmitting a transmission signal including on-off information of the switch through a signal line.

2. Description of the Related Art

Conventionally, in order to remotely monitor and control loads, there is known a technology of transmitting a transmission signal including on-off information of a switch through a signal line and switching a relay for turning on and off a load power in accordance with the transmission signal. The switch includes automatic switches for outputting a contact signal corresponding to sensed results of various sensors, as well as switches manipulated by persons.

As such a type of remote monitoring and control system, there is a known a central control system having a monitoring unit 11 having switches 13 and a control unit 12 fitted with relays 14 for turning on and off loads as terminal devices and having a transmission unit 10 as a central device, for example, as shown in FIG. 11 (see Patent Document 1). The transmission unit 10, the monitoring unit 11, and the control unit 12 are connected through two-wire signal lines 15. The transmission unit 10 identifies the monitoring unit 11 and the control unit 12 by using addresses set to the monitoring unit 11 and the control unit 12. The transmission unit 10, the monitoring unit 11, and the control unit 12 are all composed of a microcomputer.

The transmission unit 10 includes a memory storing a control table, which is a data table in which monitoring units 11 and control units 12 correspond to each other in accordance with the addresses. When the on-off information of switches 13 provided in any one monitoring unit 11 is sent to the transmission unit 10 by using a transmission signal (time-divisional multiple transmission signal), an instruction of switching the relay 14 using the transmission signal is transmitted to the control unit 12 corresponding to the monitoring unit 11 by the control table and the relay 14 of the control unit 12 is switched in accordance with the instruction. The instruction of switching the relay 14 reflects the on-off information of the switch 13. Accordingly, although the transmission unit 10 is interposed between the monitoring unit 11 and the control unit 12, the on-off state of the switch 13 is reflected in the switching of the relay 14 by transmitting the transmission signal including the on-off information of the switch 13 through the signal lines 15. One monitoring unit 11 can identify four switches 13 in maximum and one control unit 12 can identify four relays 14 in maximum. The control table provided in the transmission unit 10 makes it possible for the switches 13 and the relays 14 to correspond to each other in a unit of circuits. In the control table, the switches 13 and the relays 14 can be connected in 1:plural, as well as in 1:1.

When lighting instruments as a load are turned on or off using the relays 14, the transmission unit 10 can perform individual control that one lighting instrument is turned on and off with one switch and collective control that a plurality of lighting instruments is turned on and off with one switch. In other words, the individual control means that one circuit of load is controlled by one instruction and the collective control means that plural circuits of loads are controlled by one instruction. The collective control is classified into group control that the range of loads to be controlled is made to correspond to a switch and the loads in the range are turned on and off at a time by means of manipulation of the switch and pattern control that the range of addresses of the loads to be controlled and the on and off states of the loads are made to correspond to a switch and the loads in the range are individually turned on and off by means of the switch.

In order to perform the group control or the pattern control, the group number or the pattern number corresponding to the switch for performing the group control or the pattern control is made to correspond to the addresses of the loads in the range to be controlled in the control table provided in the transmission unit 10. When the switch for the group control or the pattern control is manipulated, the addresses of the loads to be controlled are developed by referring to the control table in the transmission unit 10, the on and off states of the loads are determined, and then an instruction is given to the control unit 12 having the address obtained by referring to the control table.

In the remote monitoring and control system, the transmission unit 10 periodically transmits the transmission signal to the signal lines 15, where a bipolar pulse width modulation signal of ±24V is used as the transmission signal. The monitoring unit 11 and the control unit 12 secure an internal power source by full-wave rectifying the transmission signal. The transmission unit 10 is supplied with commercial power. On the other hand, the control unit 12 controlling the relay 14 requires a power supply for driving the relay 14 and the relay 14 controlling the load such as a lighting instrument requires a remote control transformer 16 which is a step-down transformer in order to obtain the AC voltage of 24V for driving the relay from the commercial supply voltage (for example, AC voltage of 100V). That is, it is necessary to connect the control unit 12 and the relay 14 to the remote control transformer 16 through a driving power line 17.

Operations of the transmission unit 10, the monitoring unit 11, and the control unit 12 are briefly described. The transmission unit 10 performs normal polling that a transmission signal periodically converted from an address is periodically transmitted to the signal line 15. As the transmission signal, a start pulse indicating the start of signal transmission, mode data indicating a signal mode, address data including addresses (addresses of the monitoring unit 11 or the control unit 12) for individually calling out the monitoring unit 11 or the control unit 12, control data (including information for identifying circuits of loads) transmitting control data for controlling the loads, checksum data for detecting transmission errors, bipolar (±24V) signals including a signal returning period which is a time slot for receiving returned signals from the monitoring unit 11 or the control unit 12 are used.

When a monitoring instruction is input by means of manipulation of a switch in any one monitoring unit 11, the monitoring unit 11 transmits an interrupt signal synchronized with the start pulse of the transmission signal to the signal lines 15. The monitoring unit 11 generating the interrupt signal becomes a latch state in which an interrupt flag is set. On the other hand, when the transmission unit 10 detects the interrupt signal, the transmission unit 10 sends out the transmission data including the mode data of a search mode. When the monitoring unit 11 of the latched state receives the transmission signal of the search mode, the monitoring unit 11 sends back the address during the signal-returning period. The transmission unit 10 receiving the address identifies the monitoring terminal 11 generating the interrupt signal by transmitting the transmission signal requesting the return of the latched state to the monitoring unit 11 of the address and confirming the latched state. When the monitoring unit 11 generating the interrupt signal is identified, the transmission signal releasing the latched state is transmitted and the latched state of the monitoring unit 11 is released.

The transmission unit 10 receives the request from the monitoring unit 11 through the above-mentioned operations, the transmission unit 10 requests the control unit 12 corresponding to the monitoring unit 11 to control the load in accordance with the control table. Next, the transmission unit 10 sends out the transmission signal for confirming the operation state of the relay 14 provided in the control unit 12 and receives the operation state of the relay 14 from the control unit 12. The operation state of the relay 4 received from the control terminal is confirmed by the transmission unit 10. When the operation state of the relay 14 is an off state, the transmission unit 10 transmits the transmission signal indicating that the operation state is inverted to an on state to the monitoring unit 11 of which the switch 13 is manipulated and transmits the transmission signal indicating the same control details as described above to the control unit 12. It is intended to reflect the same control details of the control unit 12 in the display state of a display lamp for displaying an on or off state that the transmission signal indicating the same control details for the control unit 12 is transmitted to the monitoring unit 11. The control unit 12 receiving the transmission signal indicating the operation state sends back an echo back for confirming the reception thereof.

As described above, the switch 13 (the address of the monitoring unit 11 and the circuit of the switch 13) of the transmission unit 10 is combined into the control table and the transmission signal indicating the control of the relay 14 is transmitted to the control unit 12 having the relay 14 of which the correspondence with the switch 13. In this way, the on-off information of the switch 13 can be reflected in the switching of the relay 14.

[Patent Document 1] Japanese Unexamined Patent Application Publication No. 2000-10694

As described above, since the transmission unit 10, the monitoring unit 11, the control unit 12, the relay 14, and the remote control transformer 16 are required for constructing the remote monitoring and control system, there are problems that the number of constituent elements is large and that the work of selecting the elements at the time of constructing the remote monitoring and control system is troublesome and requires skill. Since it is necessary to connect the transmission unit 10, the monitoring unit 11, and the control unit 12 to the signal lines 15 and connect the control unit 12 and the relay 14 to the remote control transformer 16 through the driving power lines 17, the connection work of the signal lines 15 and the driving power lines 17 is troublesome. In addition, when the plural circuits of relays 14 are controlled by the control unit 12, the connecting relations among the control unit 12, the relays 14, and the remote control transformer 16 are complex, thereby making troublesome the connection work.

SUMMARY OF THE INVENTION

The present invention is contrived to solve the above-mentioned problems and it is an object of the present invention to provide a remote control wiring mechanism, which makes it easy to construct a system by facilitating a connection work and treatment of members for constructing the system.

According to Aspect 1 of the present invention, there is provided a remote control wiring mechanism in which switching of a relay is remotely controlled by means of on and off of a switch by transmitting a transmission signal including on-off information of the switch through a signal lines, the remote control wiring mechanism comprising: a main unit having a signal input and output unit connected to the signal line for transmitting the on-off information of the switch; and a relay unit which has a relay, is attached to and detached from a relay fitting part of the main unit, and is formed integrally with the main unit and electrically connected to the main unit at the time of fitting thereof, wherein the main unit has a power supply circuit for supplying power used for driving the relay and switches the relay fitted to the relay unit in accordance with the on-off information of the switch received through the signal input and output unit.

In the above-mentioned structure, since the relay fitting part is provided in the main unit connected to the signal line and the relay unit having a relay is electrically connected to the main unit when the relay unit is fitted to the main unit, the connection work for the relay is not required and the connection work for constructing a system is facilitated. The relay unit having a relay can form a member along with the main unit when the relay unit is fitted to the relay fitting part of the main unit. Accordingly, in a state where the main unit and the relay unit are coupled to each other, they can be treated as one member and the load-side member among members constituting a system is one member, thereby facilitating the selection of the members for constructing a system.

According to Aspect 2 of the present invention, in the remote control wiring mechanism of Aspect 1, the remote control wiring mechanism may be used for a remote monitoring and control system which comprises a monitoring unit having the switch, a control unit controlling a load, and a transmission unit having a control table in which the monitoring unit corresponds to the control unit by addresses. The transmission unit may remotely control the load by transmitting the transmission signal including the on-off information of the switch from the monitoring unit to the control unit with the control table, the transmission unit is provided in the main unit, and the control table has correspondence between the switch and the relay.

In the above-mentioned structure, in a remote monitoring and control system, which transmits the on-off information of the switch using an address, the switching of the relay can be controlled only by employing the monitoring unit and the main unit without using the control unit.

According to Aspect 3 of the present invention, in the remote control wiring mechanism of Aspect 1 or 2, the main unit may have a structure that a power supply unit having the power supply circuit and a socket unit having the relay fitting part may be successively disposed.

In the above-mentioned structure, since the power supply unit having a power supply circuit and the socket unit having the relay fitting part are successively disposed, the relay fitting part can be used without waste by successively disposing the socket units corresponding to the number of relays. Accordingly, it is possible to save a space, compared with a case where the relay driving circuits and the relay fitting parts are not used.

According to Aspect 4 of the present invention, in the remote control wiring mechanism of Aspect 3, the power supply unit may include the relay fitting part.

In the above-mentioned structure, since the power supply unit having the power supply circuit and the socket unit having the relay fitting part are successively disposed, the relay fitting part can be used without waste by successively disposing the socket units corresponding to the number of relays. Accordingly, it is possible to save a space, compared with a case where the relay driving circuits and the relay fitting parts are not used. In addition, since the relay fitting part is provided in the power supply unit, it is possible to utilize only the power supply unit and the relay without disposing the socket unit when the relay fitting parts provided in the power supply unit correspond to the number of necessary relays.

According to Aspect 5 of the present invention, in the remote control wiring mechanism of Aspect 3 or 4, the socket unit may include a successively disposing connector enabling attachment and detachment with another socket unit.

In the above-mentioned structure, since the socket unit is connected to the successively disposing connector, the connection work for the socket unit is not necessary. In addition, since the successively disposing connector is detachable, the number of socket units can be increased or decreased in accordance with the number of necessary relays.

According to Aspect 6 of the present invention, in the remote control wiring mechanism of Aspect 5, the socket unit may include one relay fitting part.

In the above-mentioned structure, since the socket unit and the relay corresponds to each other in 1:1, the socket units can be disposed corresponding to the number of necessary relays, thereby not wasting the socket units.

According to Aspect 7 of the present invention, in the remote control wiring mechanism of Aspect 1 or 2, the socket unit may include a plurality of relay fitting parts.

In the above-mentioned structure, since a plurality of relays can be attached to and detached from one socket unit, it is possible to increase or decrease the number of relays within the space for disposing the socket units.

According to Aspect 8 of the present invention, in the remote control wiring mechanism of any one of Aspects 1 to 7, base bodies of the main unit and the relay unit may be formed such that the size of a structure in which the main unit and the relay unit are coupled belongs to an agreed switchboard dimension.

In the above-mentioned structure, since the coupled size of the main unit and the relay unit belongs to the agreed switchboard dimension, it is possible to receive them in a switchboard without using any size-adjusting adapter.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 11:
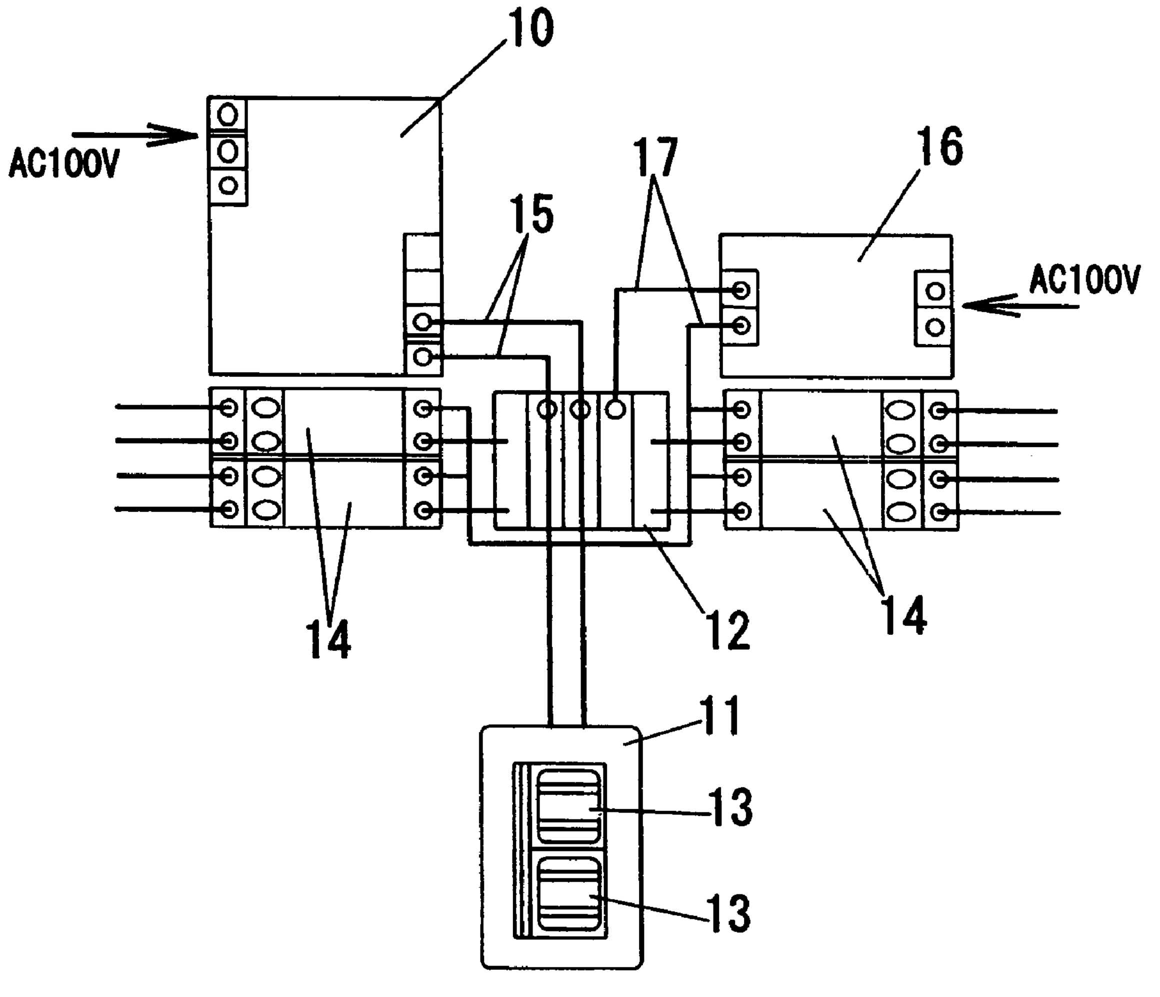
FIG. 11 is a diagram illustrating a conventional example.

A remote control wiring mechanism explained in the following embodiments comprises a mother device 1 (see FIG. 5) having a function as the transmission unit 10 and a son device 2 (see FIG. 5) not having a function of the transmission unit 10 but having a function of the control unit 12 among the elements of the remote monitoring and control system shown in FIG. 11. The mother device 1 and the son device 2 are constructed by detachably connecting relay units 30 to a main unit 20. A relay unit 30 has relays for turning on and off loads.

Since the mother device 1 has a function of the transmission unit 10, the manipulation of a switch 13 provided in the monitoring unit 11 can be reflected in the on and off of the relays of the relay unit 30 provided in the mother device 1 by connecting the monitoring unit 11 using two-wire signal lines 15. In addition, since the son device 2 has a function of the control unit 12, the manipulation of the switch 13 provided in the monitoring unit 11 can be reflected in the on and off of the relays of the relay unit 30 provided in the son device 2 by connecting the son device 2 to the mother device 1 fitted with the monitoring unit 11 using the two-wire signal lines 15. In addition, the function of the control unit 12 may be given to the mother device 1 such that the relay unit 30 of the mother device 1 is treated equivalent to the relay unit 30 of the son device 2. However, since the relay unit 30 of the mother device 1 can be controlled through an internal process of the mother device 1, the relay unit 30 is controlled without any transmission signal (that is, without modulating the pulse width of data). However, since the information corresponding to the address of the control unit 12 should be used in order to treat the relay unit 30 of the mother device 1 to be equivalent to the relay unit 30 of the son device 2 even when not using the transmission signal, the relay unit 30 of the mother device 1 is made to correspond to the switch 13 by using the control table. Although examples that the mother device 1 and the son device 2 are combined are described in the following embodiments, only the mother device 1 may be utilized if only the number of relays provided in the mother device 1 belongs to the range of the number of the relay units 30 provided in the mother device 1.

First Embodiment

Figure 1:
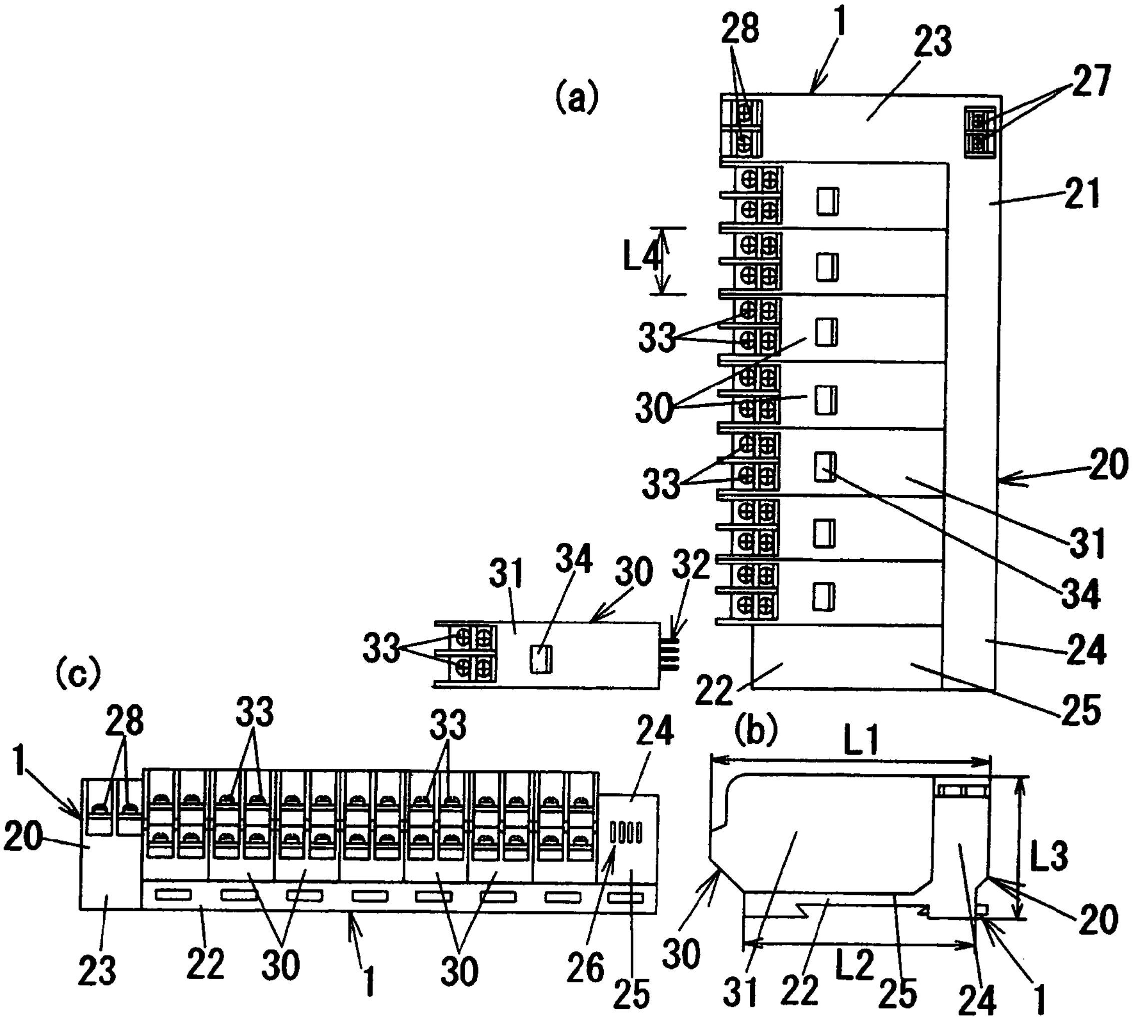
FIG. 1 is a mother device according to a first embodiment of the present invention, where FIG. 1(*a*) is a plan view, FIG. 1(*b*) is a side view, and FIG. 1(*c*) is a front view.
Figure 5:
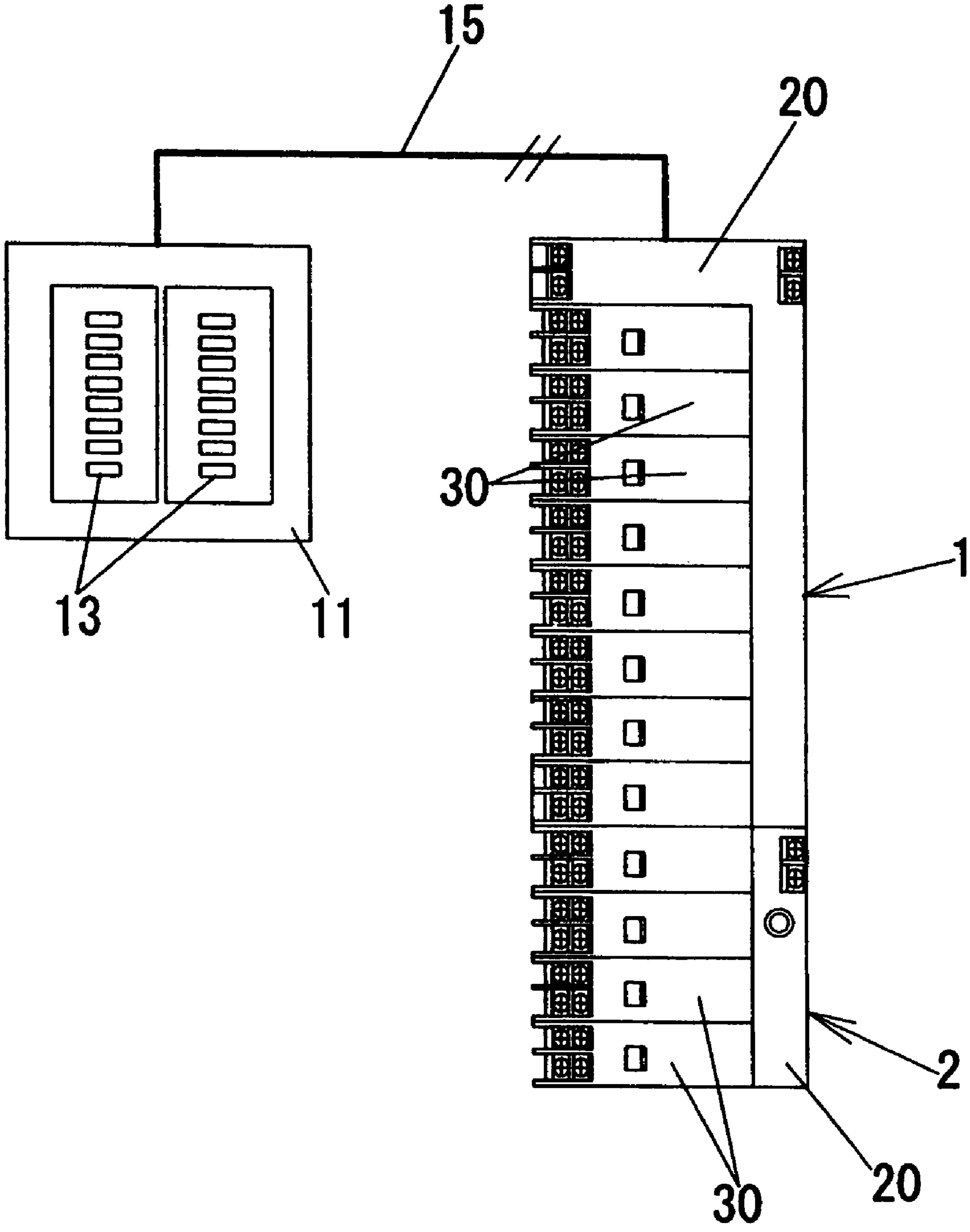
FIG. 5 is a diagram illustrating a structure of the first embodiment.

In the mother device 1 constructing the system shown in FIG. 5, a body 21 of a main unit 20 has a shape that a side frame 23 is protruded from one side of two sides adjacent to each other in a rectangular bottom plate 22 and a rear frame 24 is protruded from the other side, as shown in FIG. 1. The side frame 23 and the rear frame 24 have the same height from the bottom plate 22 and the side frame 23 and the rear frame 24 meet each other at one corner of the bottom plate 22. In brief, since the side frame 23 and the rear frame 24 meet each other, it is formed in an L shape as seen in a plan view. The portion surrounded with the bottom plate 22, the side frame 23, and the rear frame 24 serves as a relay support platform 25 in which the relay units 30 are disposed.

The number of the relay units 30 arranged in the relay support platform 25 is eight in maximum. That is, as shown in FIG. 1(*c*), eight relay sockets 26 as eight relay fitting parts are formed on the surface of the rear frame 24 facing the relay support platform 25 and the relay units 30 are detachably coupled to the relay sockets 26, respectively. Each relay socket 26 has four inserting holes and each inserting hole is formed in a shape, which extends in a direction perpendicular to the surface of the bottom plate 22. A surface (hereinafter, referred to as top surface) of the side frame 23 of the bottom plate 20 which is parallel to the bottom plate 22 and which is apart from the bottom plate 22 is provided with power supply terminals 27 and signal terminals 28 having terminal screws. Power supply lines for supplying commercial power are connected to the power supply terminals 27 and signal lines 15 (see FIG. 5) are connected to the signal terminals 28. In addition, the power supply terminals 27 are disposed at an end apart from the rear frame 24 and the signal terminals 28 are disposed at an end close to the rear frame 24. That is, the power supply terminals 27 and the signal terminals 28 are spaced apart from each other.

The relay units 30 have a latching relay built in the body 31 and coil terminals 32 connected to set windings and reset windings respectively are protruded. That is, the coil terminals 32 are composed of four inserting pieces. The inserting pieces of the coil terminals 32 are inserted into the inserting holes of the relay sockets 26, respectively and the relay units 30 are electrically and mechanically coupled to the main unit 20, whereby the main unit 20 and the relay unit 30 are integrally coupled to each other. Load terminals 33 having terminal screws are arranged on the surface opposite to the surface of the body 31 of each relay unit 30 from which the coil terminals 32 are protruded. In addition, the top surface of the body 31 of the relay unit 30 is provided with a manual lever 34 for manually performing the switching of the built-in relay.

Figure 2:
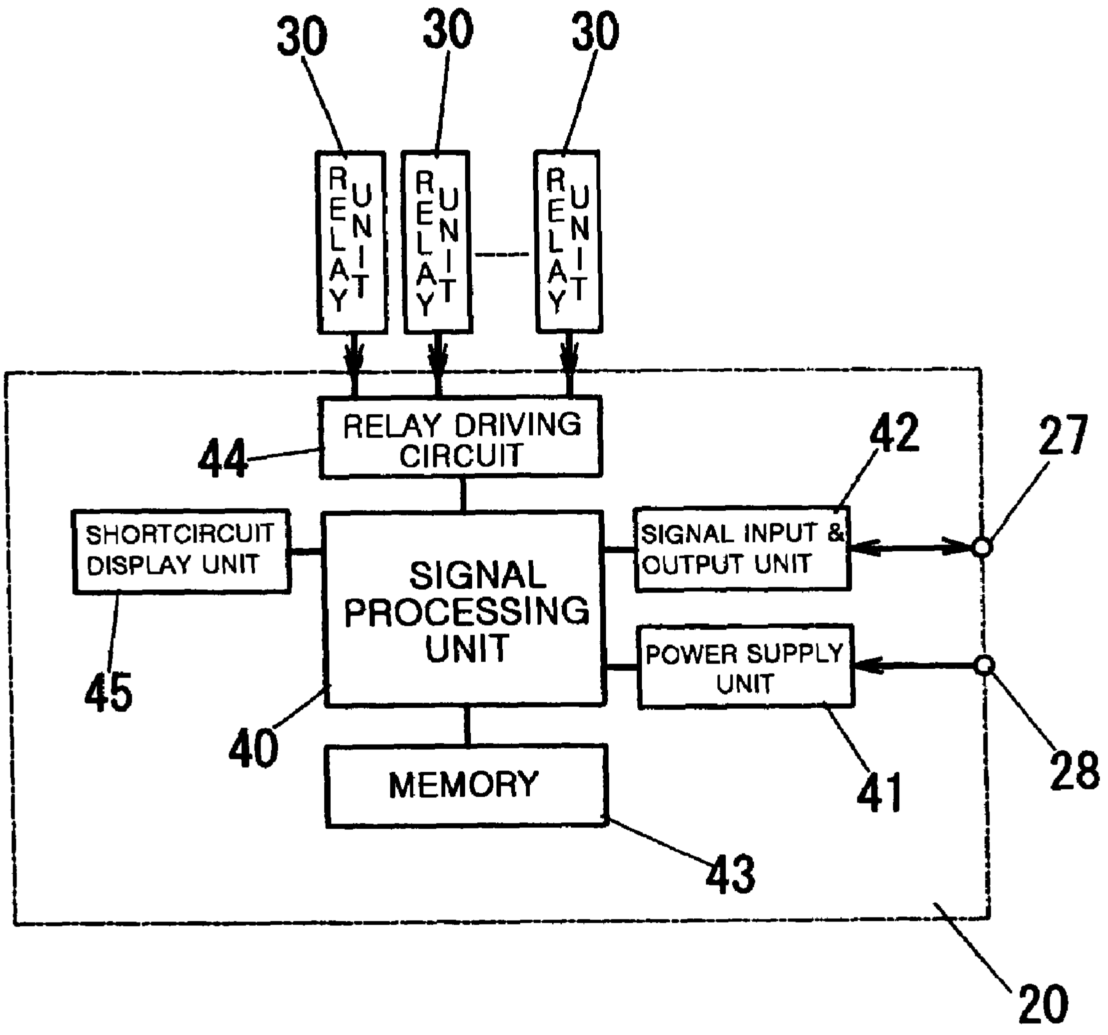
FIG. 2 is a block diagram of the mother device according to the first embodiment.

The mother device 1 according to the present embodiment comprises, as shown in FIG. 2, a power supply circuit 41 connected to the power supply terminals 27 to supply power to inner circuits thereof and a signal input and output unit 42 connected to the signal terminals 28 to transmit and receive the transmission signal. The power supply circuit 41 is received in the side frame 23 of the main unit 20 and other internal circuits are received in the rear frame 24. Accordingly, the insulation distance of the internal circuits can be relatively great. The power supply circuit 41 generates power for the internal circuits from the input AC voltage of 100 V to 242 V so as to correspond to the commercial power supply of different voltages. The signal input and output unit 42 transmits the bipolar transmission signal described above and receives a current signal obtained by short-circuiting the signal lines 15 with properly low impedance. That is, data to the monitoring unit 11 or the control unit 12 (or the son device 2) are transmitted as a voltage signal and data from the monitoring unit 11 or the control unit 12 (or the son device 2) are received as a current signal.

The power supply circuit 41 and the signal input and output unit 42 are connected to a signal processing unit 40 including a microcomputer. The signal processing unit 40 controls to switch the relays built in the relay units 30 or the relays provided in the control unit 12 (or the son device 2) in accordance with the data received through the signal input and output unit 42. It is stored in the control table of the memory 43 provided in the signal processing unit 40, which relay to control for the switches 13 provided in the monitoring unit 11. The correspondence of 1:1 or 1:plural is set in the control table. In brief, the control tables for the individual control, the pattern control, and the group control is set in the memory 43. An area for storing the on and off states of the relays is provided in the memory 43. A nonvolatile memory such as EEPROM is used in the memory 43.

In addition, a relay driving circuit 44 is connected to the signal processing unit 40 and the signal processing unit 40 controls to switch the relays built in the relay units 30 through the relay driving circuit 44. The voltage necessary for driving the signal processing unit 40 is, for example, DC 5V and the voltage necessary for driving relay is, for example, AC 24V. The driving voltages are varied by the relay driving circuit 44. A short-circuit display unit 45 is added to the signal processing unit 40. When the short-circuit of the signal lines 15 is detected, the short-circuit display unit 45 displays the short-circuit state.

In the present embodiment, the sizes L1 to L3 shown in FIG. 1(*b*) are 106.3 mm, 90 mm, and 60 mm, respectively, in a state where the relay units 30 are fitted to the main unit 20 and belong to so-called agreed switchboard dimensions (sizes determined in JIS Standard as an internal dimension standard of a switchboard), so that they can be received in the switchboard used for reception of the breaker. The width of the one relay unit 30 (L4 in FIG. 1(*a*)) is 24.9 mm, which is one unit size in the agreed switchboard dimension, and the width of the bottom plate 22 of the main unit 20 is equal to the width of the relay unit 30. Therefore, in a state where eight relay units 30 are fitted to the main unit 20, the size corresponding to nine unit sizes in the agreed switchboard dimension is obtained. In other words, the mother device 1 can be received in the space corresponding to nine unit sizes in the agreed switchboard dimension.

As described above, since the main unit 20 is provided with the power supply terminals 27 connected to the commercial power and the power supply circuit 41 built in the main unit 20 generates the power for driving the relays, the conventional remote control relay is not necessary. In addition, since there is provided the function of a transmission unit, the transmission unit is not necessary. Conventionally, the control unit 12 and the relays 14 are separately provided, the selection of elements is required for constructing a system and labors are required for fitting the control unit 12 and the relays 14 at the time of construction thereof. However, in the present embodiment, since the main unit 20 and the relay units 30 can be treated as one body, it is easy to select the elements. Conventionally, it is necessary to perform the connection work of the control unit 12, the relays 14, and the remote control transformer 16. However, in the present embodiment, since the mechanical and electrical coupling of the relay units 30 is possible only by inserting the relay units 30 into the relay sockets 26, it is easy to the connection work for constructing a system. In the main unit 20, the power supply terminals 27 and the signal terminals 28 are disposed apart from each other and the main unit 20 and the power supply terminals 27 are adjacent to the load terminals 33 of the relay units 30, the insulation distance between the power supply lines connected to the power supply terminals 27 and the load terminals 33 and the signal lines connected to the signal terminals 28 can be relatively increased.

Figure 3:
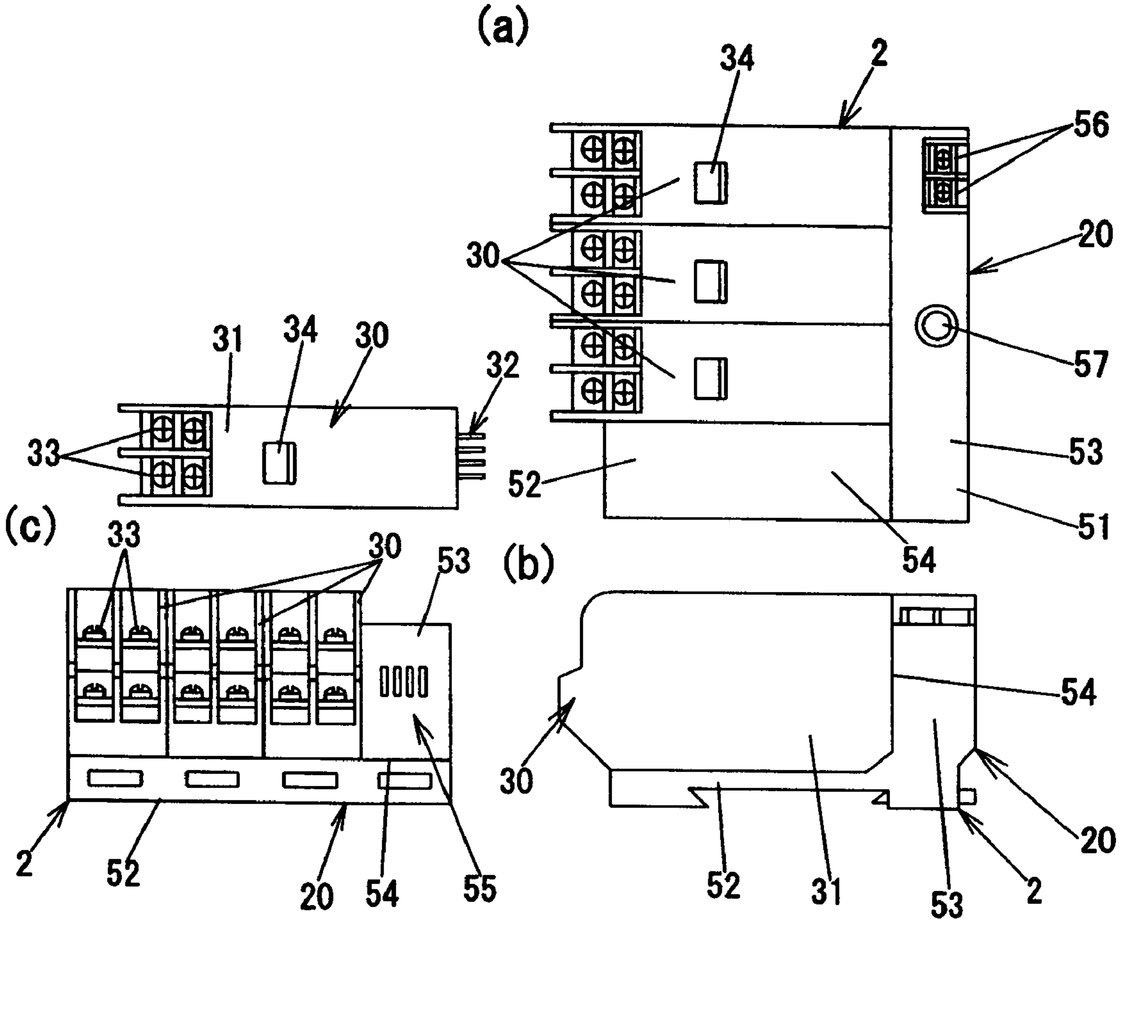
FIG. 3 is a son device according to the first embodiment of the present invention, where FIG. 3(*a*) is a plan view, FIG. 3(*b*) is a side view, and FIG. 3(*c*) is a front view.

On the other hand, in the son device 2 constituting the system shown in FIG. 5, the body 51 of the main unit 20 has a shape that a rear frame 53 is protruded from one side of a rectangular bottom plate 52, as shown in FIG. 3. In the body 51 of the son device 2, the portion surrounded with the bottom plate 52 and the rear frame 53 serves as a relay support platform 54 in which the relay units 30 are disposed.

Four relay units 30 in maximum can be arranged in the relay support platform 54 of the son device 2. As shown in FIG. 3(*c*), four relay sockets 55 are formed on the surface of the rear frame 53 facing the relay support platform 54. The construction of the relay sockets 55 is similar to that of the mother device 1 and four rectangular inserting holes are provided therein. Signal terminals 56 fitted with terminal screws for connecting the signal lines 15 are formed on the top surface (the top surface of FIG. 3(*b*)) of the rear frame 53 of the main unit 20. The power supply terminals are not formed in the main unit 20 of the son device 2 and the power is supplied by the transmission signal from the mother device 1 through the signal terminals 56.

As described above, the son device 2 has a function as a control unit 12 (see FIG. 11) and an address is set thereto. The address of the son device 2 is selected by rotating an address setting handle 57 disposed on the top surface of the rear frame 53. The relay units 30 have the same structure as that of the mother device 1 and are detachably fitted to the relay sockets 55. The relay units 30 can be electrically and mechanically coupled to the main unit 20 by inserting the inserting piece of relay unit 30 to the inserting holes of relay socket 55.

Figure 4:
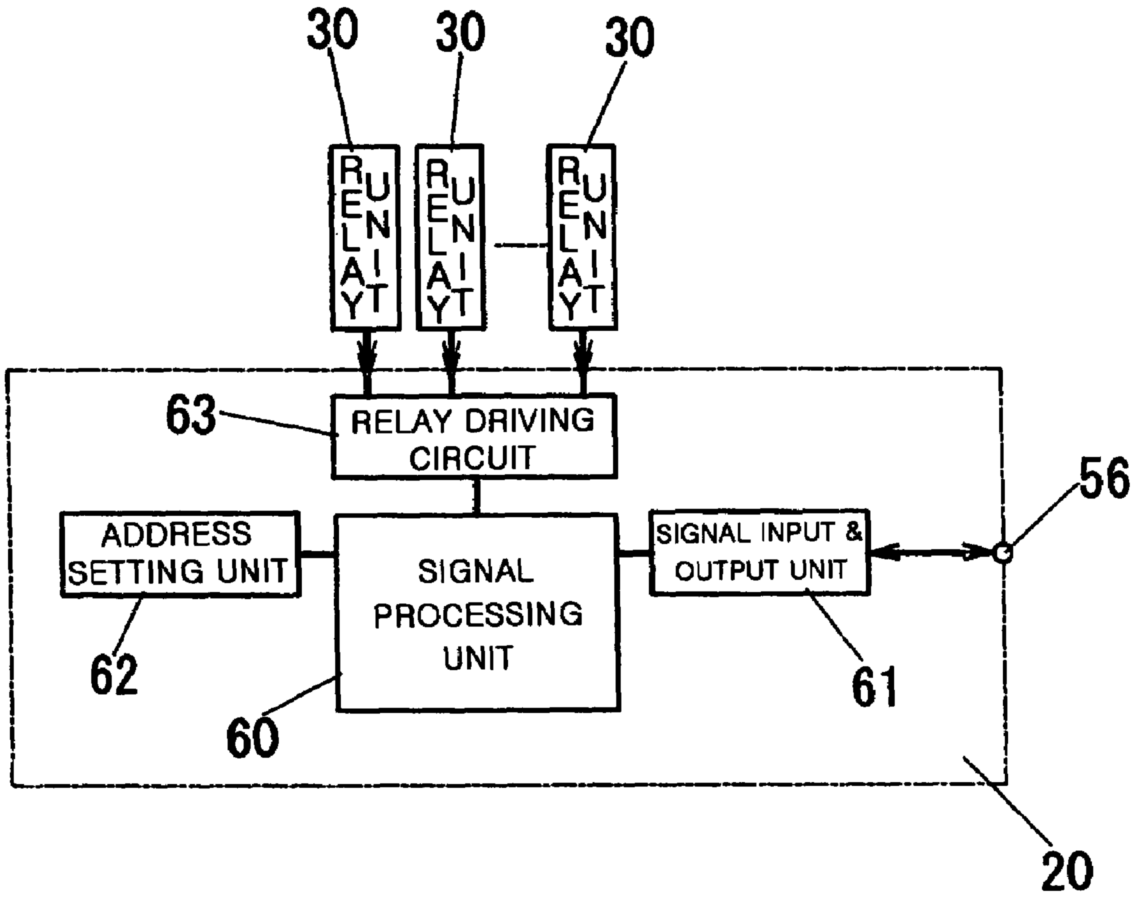
FIG. 4 is a block diagram of the son device according to the first embodiment.

As shown in FIG. 4, the son device 2 of the present embodiment comprises a signal input and output unit 61 connected to the signal terminals 28 to transmit and receive the transmission signal. The signal input and output unit 61 can receive the bipolar transmission signal described above and can transmit a current signal obtained by short-circuiting the signal lines 15 with properly low impedance. That is, the signal input and output unit 42 of the mother device 1 transmits a voltage signal and receives a current signal, but the signal input and output unit 61 of the son device 2 receives a voltage signal and transmits a current signal.

The signal input and output unit 61 is connected to the signal processing unit 60 composed of a micro computer and the signal processing unit 60 controls the switching of the relays built in the relay units 30 by using the data received through the signal input and output unit 61 from the mother device 1. The address of the son device 2 can be set by manipulating the address setting handle 57 and an address setting unit 62 comprising a switch operating together with the address setting handle 57 is connected to the signal processing unit 60.

The relay driving circuit 63 is connected to the signal processing unit 60 and the signal processing unit 60 controls the switching of the relays built in the relay units 30 through the relay driving circuit 63. The power for driving the relay units 30 is obtained by full-wave rectifying the transmission signal received through the signal terminals 56 and the signal input and output unit 61 has the function. That is, the signal input and output unit 61 serves as a power supply circuit in the son device 2.

Similarly to the mother device 1, the son device 2 has the agreed switchboard dimension in a state where the relay units 30 are fitted to the main unit 20 and can be received in the switchboard used for receiving a breaker. However, the number of relay units 30 which can be controlled in the son device 2 is four in maximum and the son device 2 has the size corresponding to four unit sizes in the agreed switchboard dimension in the state where four relay units 30 are fitted to the main unit 20. As shown in FIG. 5, the son device 1 shown in FIG. 1 and the son device 2 shown in FIG. 3 can be fitted together.

In constructing the remote monitoring and control system, it is sufficient that the mother device 1 is connected to the commercial power through the power supply lines, the signal lines 15 are connected to the signal terminals 27 of the mother device 1 and the signal terminals 56 of the son device 2, and the monitoring unit 11 is connected to the signal lines 15. Accordingly, the number of elements necessary for constructing a system is smaller than that of the conventional case and the connection work is facilitated.

As described above, in the structure of the present embodiment, since the main unit 20 and the relay units 30 can be treated as one body in the son device 2, it is easy to select the elements. Conventionally, the connection work of the control unit 12, the relays 14, and the remote control transformer 16 are necessary. However, in the present embodiment, since the relay units 30 can be mechanically and electrically coupled only by inserting the relay units 30 into the relay sockets 26, it is possible to facilitate the connection work for constructing a system.

Second Embodiment

Figure 6:
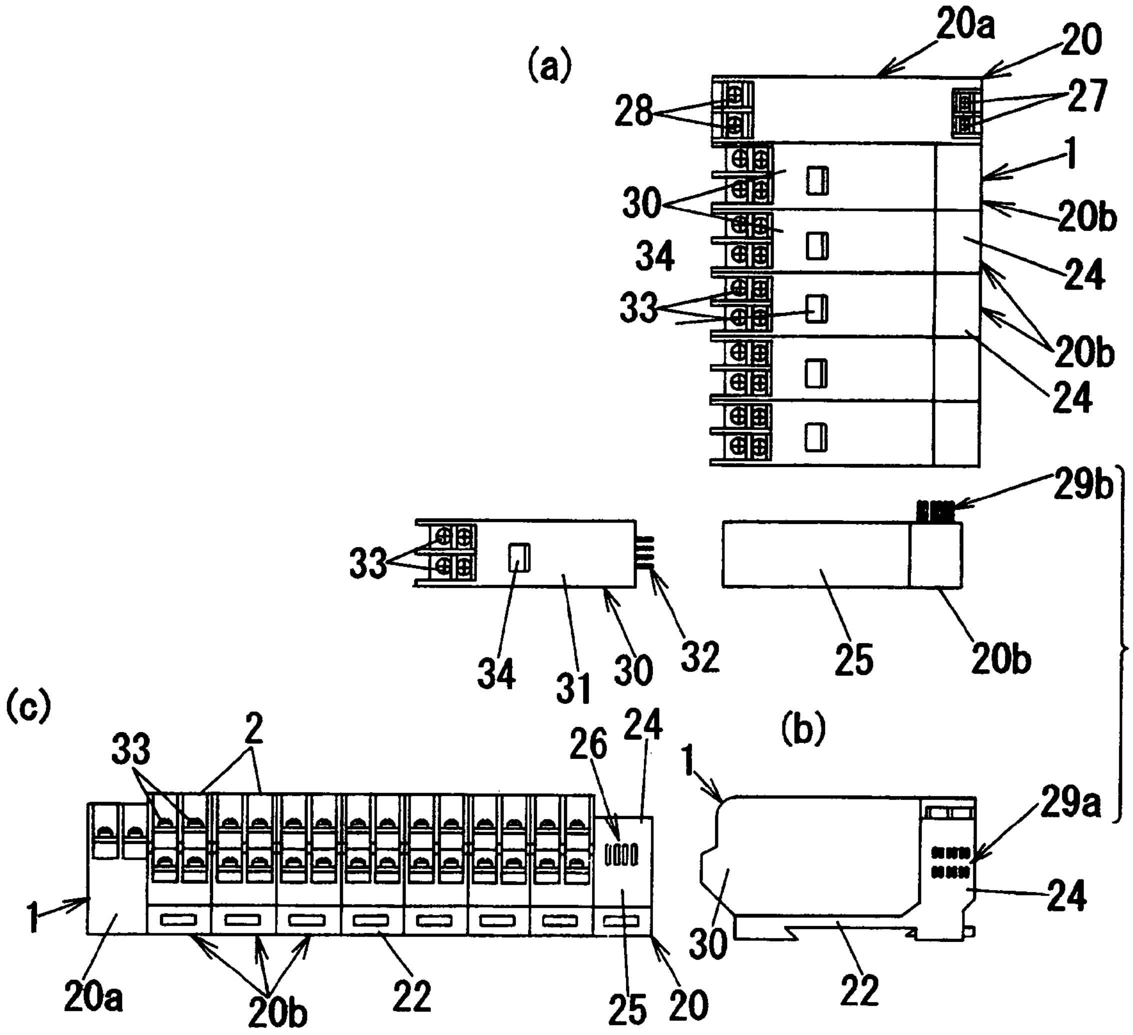
FIG. 6 is a mother device according to a second embodiment of the present invention, where FIG. 6(*a*) is a plan view, FIG. 6(*b*) is a side view, and FIG. 6(*c*) is a front view.

The present embodiment is obtained by modifying the structure of the first embodiment and as shown in FIG. 6, the main unit 20 comprises a power supply unit 20*a* not built with the relay driving circuit 44 but built with the power supply circuit 41 and socket units 20*b* not built with the power supply circuit 41 but built with the relay driving circuit 44 and the relay sockets 26, where the power supply unit 20*a* and the socket units 20*b* are successively disposed. Each socket unit 20*b* has one relay socket unit 26 and eight socket units 20*b* in maximum can be successively disposed. That is, the power supply unit 20*a* is formed in a rectangular parallelepiped shape corresponding to the side frame 23 in the main unit 20 of the first embodiment. The socket units 20*b* have a width (size L4 of FIG. 1) suitable for fitting one relay unit 30 thereto and has a bottom plate 22 and a rear frame 24. In other words, the power supply unit 20*a* has a unit size in the agreed switchboard dimension and the size in a state where the relay unit 30 is fitted to the socket unit 20*b* is a unit size in the agreed switchboard dimension.

A female connector 29*a* of a successively-disposing connector 29 is disposed in the power supply unit 20*a* and each socket units 20*b*. A male connector 29*b* of the successively-disposing connector 29 which is detachably inserted into the female connector 29*a* is disposed in each socket unit 20*b*. Two lines of inserting holes opened in a rectangular shape are arranged in the female connector 29*a* and a plurality of inserting pieces-inserted-into the inserting holes of the female connector 29*a* is disposed in the male connector 29*b*.

Figure 7:
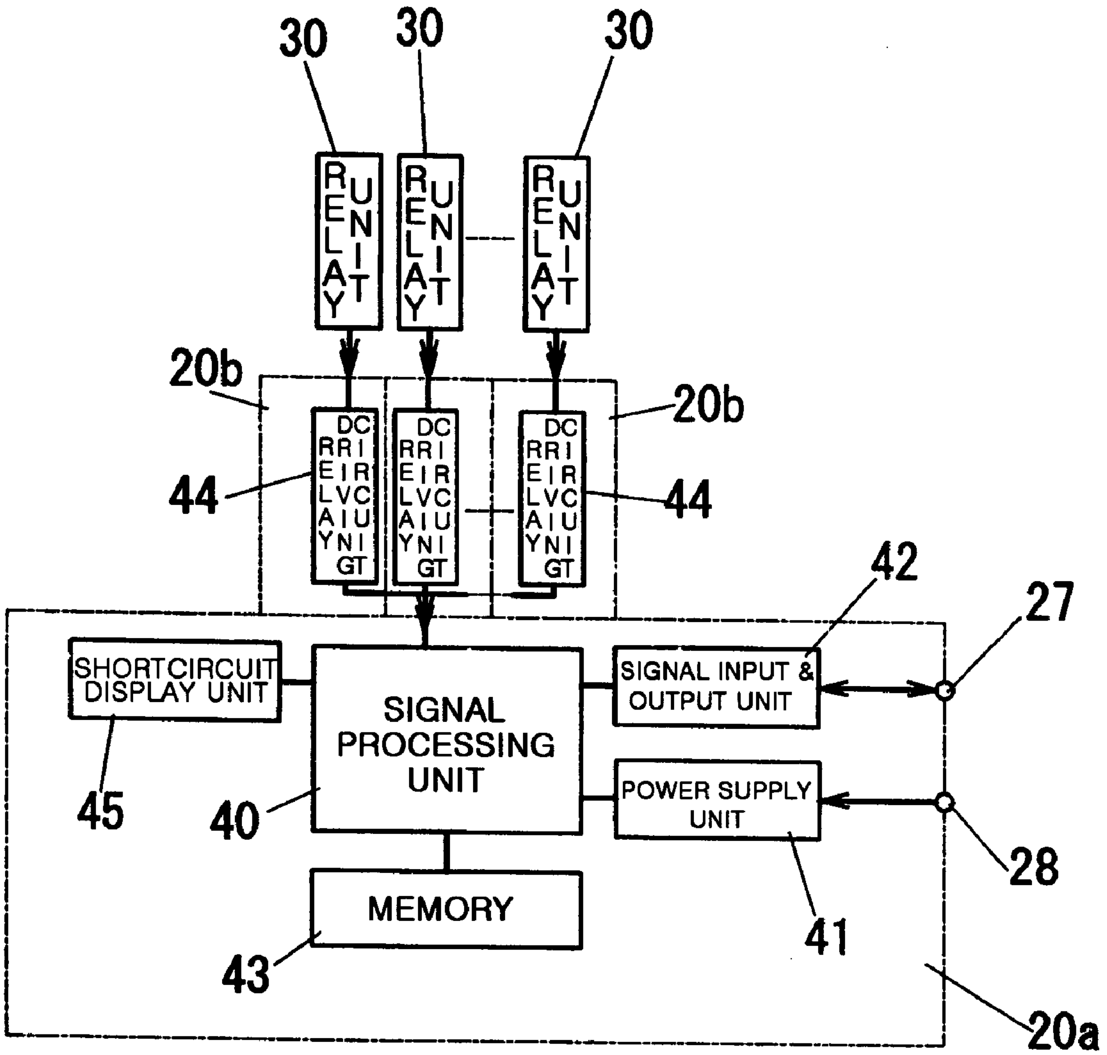
FIG. 7 is a block diagram of the mother device according to the second embodiment.

As shown in FIG. 7, the power supply unit 20*a* is provided with the signal processing unit 40, the signal input and output unit 42, the memory 43, and the short-circuit display unit 45, in addition to the power supply circuit 41. Each socket unit 20*b* is provided with only the relay driving circuit 44. In the present embodiment, since the power supply unit 20*a* and the socket unit 20*b* are successively disposed, the connection relation between the signal processing unit 40 and the relay driving circuit 44 can be selected such that the signal processing unit 40 disposed in the power supply unit 20*a* can individually identify the relay driving circuits 44 disposed in the socket units 20*b*. However, since it causes a problem that the respective socket units 20*b* is designed in different specifications, the connection relation between the respective socket units 20*b* and the signal processing unit 40 is selected by using a selection switch not shown.

That is, the plurality of inserting holes of the female connector 29*a* disposed in the power supply unit 20*a* are provided to individually insert eight relay driving circuits 44 thereto and one of eight relay driving circuits 44 corresponding to the socket unit 20*b* can be selected by manipulating the selection switch of each socket unit 20*b*. It is supposed that identification numbers 1 to 8 are given to identify the eight relay driving circuits 44. Then, in the socket unit 20*b* coupled to the power supply unit 20*a*, identification number 1 is selected by the selection switch and is allocated to the socket unit 20*b*. In the socket unit 20*b* coupled to the socket unit 20*b* having identification number 1, identification number 2 is selected by the selection switch and given to the socket unit 20*b*. Similarly, one of identification numbers 1 to 8 can be given to the respective socket units 20*b*.

In the above-mentioned example, the identification numbers are given to the socket units 20*b* in accordance with the order of positions from the power supply unit 20*a*. However, the positions and the identification numbers of the socket units 20*b* may not correspond to each other and the same identification number may be given to a plurality of socket units 20*b*.

In the example shown in the figure, twelve inserting holes are formed in the female connector 29*a*, four inserting holes among the those are used to transmit a signal instructing the control of the relays provided in the relay units 30, and the remaining eight inserting holes are used to transmit a signal specifying the identification numbers of the socket units 20*b*. That is, the eight inserting holes correspond to the identification numbers, respectively. In a case of controlling the relay units 30, when a signal corresponding to any one of the eight inserting holes is set to a different value from that of a signal corresponding to another inserting holes (where, two-value signals are supposed) and the signal instructing the control of the relays is transmitted, only the relay unit 30 coupled to the specified socket unit 20*b* is controlled. As can be clearly seen from the above-mentioned description, the relay units 30 are controlled not simultaneously but individually. Since the relays provided in the relay units 30 are of a latch type, the relays maintain the same state until a signal for inverting the contact points is supplied after the contact points are once inverted.

In the first embodiment, since the main unit 2 is formed in the size in which the eight relay units 30 can be fitted, an arrangement space corresponding to nine unit sizes in the agreed switchboard dimension is required. However, in the present embodiment, since the number of socket units 20*b* can be changed to correspond to the number of relay units 30, the arrangement space can be enlarged or reduced to correspond to the number of relay units 30. For example, when only four relay units 30 are used, the first embodiment requires the arrangement space corresponding to nine unit sizes in the agreed switchboard dimension, but the present embodiment requires the arrangement space corresponding to five unit sizes in the agreed switchboard dimension. Therefore, it is possible to save the arrangement space when the number of relay units 30 is small.

Figure 8:
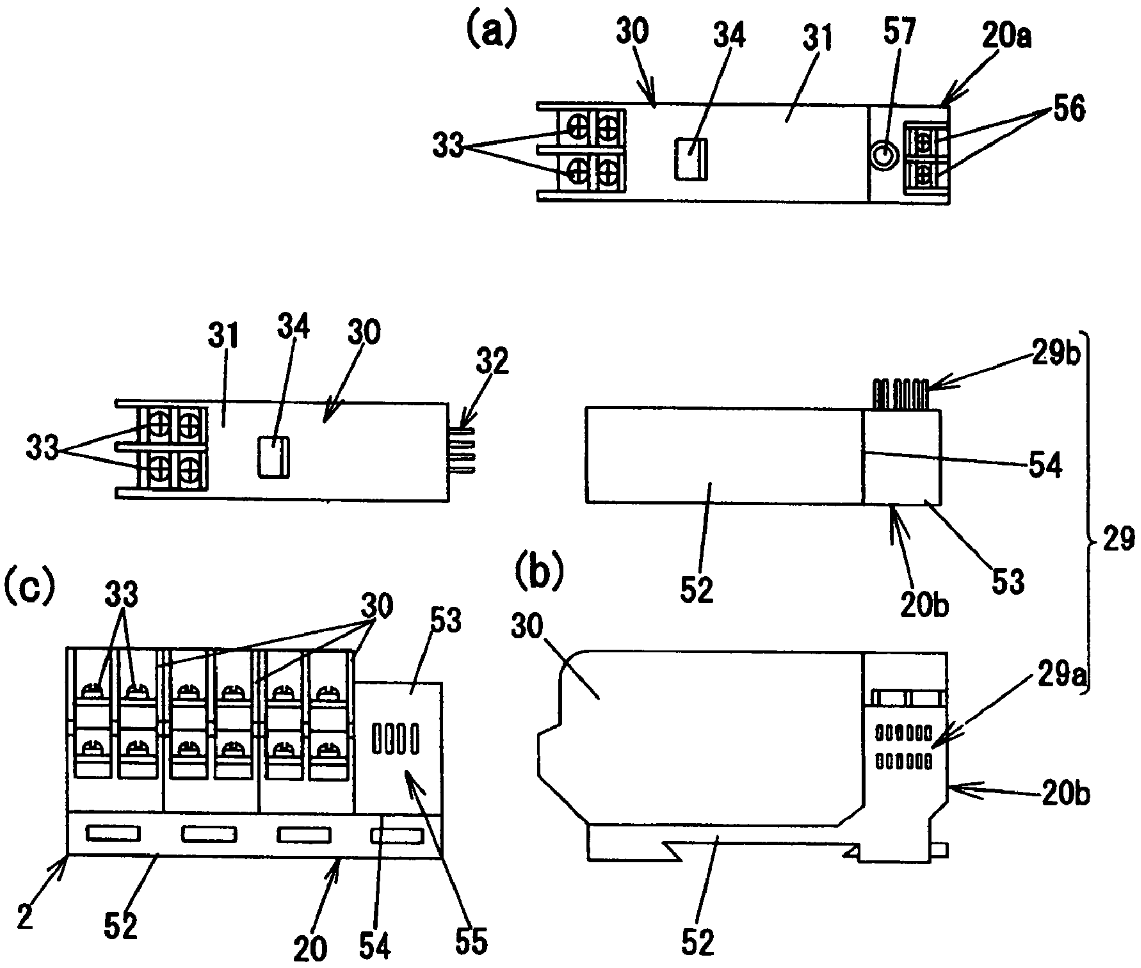
FIG. 8 is a son device according to the second embodiment of the present inventions, where FIG. 8(*a*) is a plan view, FIG. 8(*b*) is a side view, and FIG. 8(*c*) is a front view.

As described in the first embodiment, the son device 2 obtains internal power from the signal lines 15 and the signal input and output unit 61 serves as a power supply circuit. Therefore, as shown in FIG. 8, the son device 2 is constructed by successively disposing the power supply unit 20*a* having the signal input and output unit 61 and the socket units 20*b* having the relay sockets 55. In the son device 2, the relay sockets 55 are disposed in the power supply unit 20*a*.

The son device 2 comprises the signal processing unit 60, the address setting unit 62, and the relay driving circuit 63, in addition to the signal input and output unit 61. The signal processing unit 60, the signal input and output unit 61, the address setting unit 62, and the relay driving circuit 63 are provided in the power supply unit 20*a*. The relay driving circuits 63 are also provided in the socket units 20*b*. The power supply unit 20*a* of the son device 2 is provided with the address setting handle 57 in addition to the signal terminals 56 connected to the signal lines 15. The number of relay units 30 usable for the son device 2 is four in maximum. However, when only four identification numbers among the eight identification numbers of the socket units 20*b* of the mother device 1 are used, the socket units 20*b* of the mother device 1 can be used in the son device 2. That is, it is possible to prevent the increase in kinds of components by means of the common use of components.

As can be clearly seen from the above-mentioned description, the mother device 1 and the son device 2 according to the present embodiment have the minimum structure including one power supply unit 20*a* and one socket unit 20*b*. The minimum structure has a size corresponding to two unit sizes in the agreed switchboard dimension. Other structures and operations are similar to those of the first embodiment.

Third Embodiment

Figure 9:
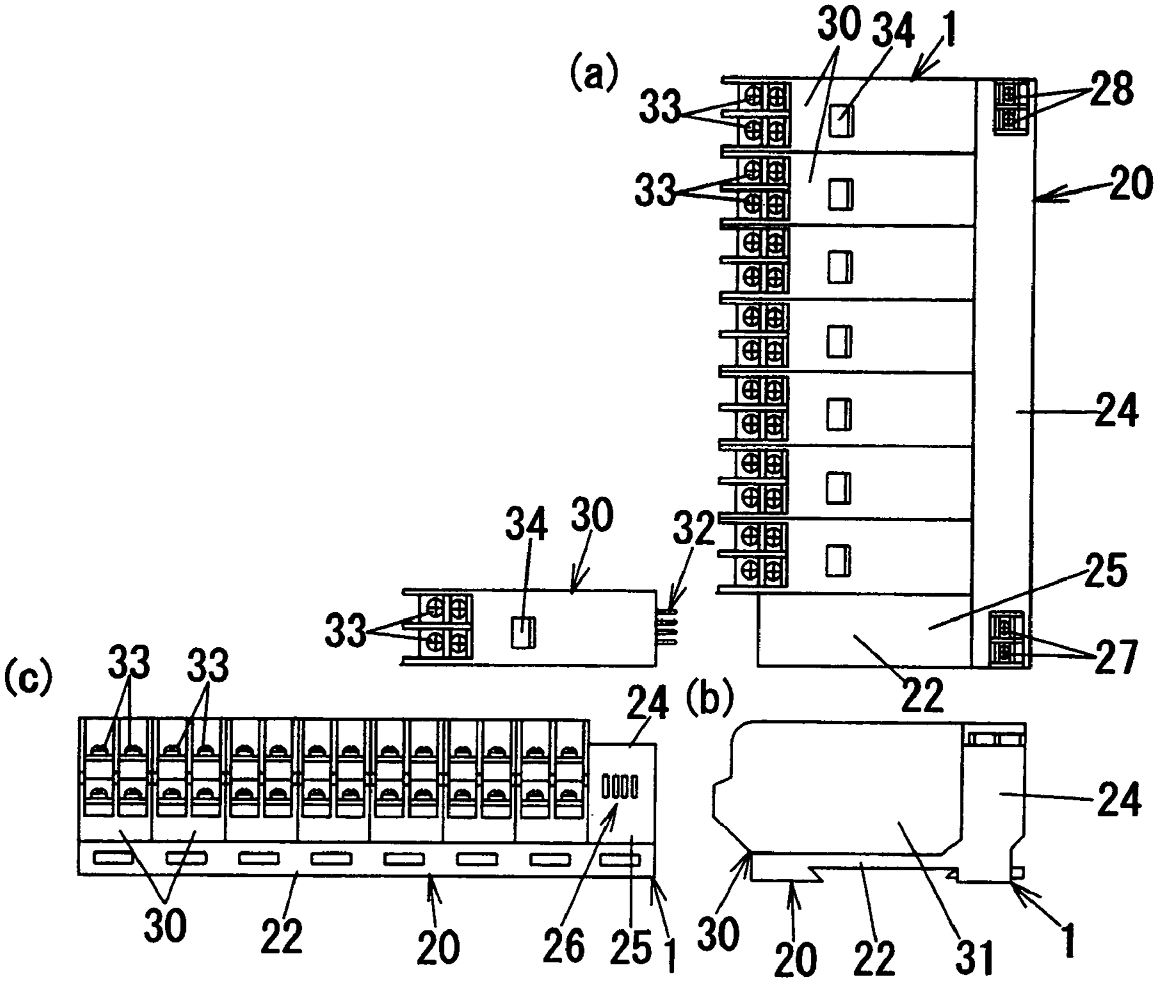
FIG. 9 is a mother device according to a third embodiment of the present invention, where FIG. 9(*a*) is a plan view, FIG. 9(*b*) is a side view, and FIG. 9(*c*) is a front view.
Figure 10:
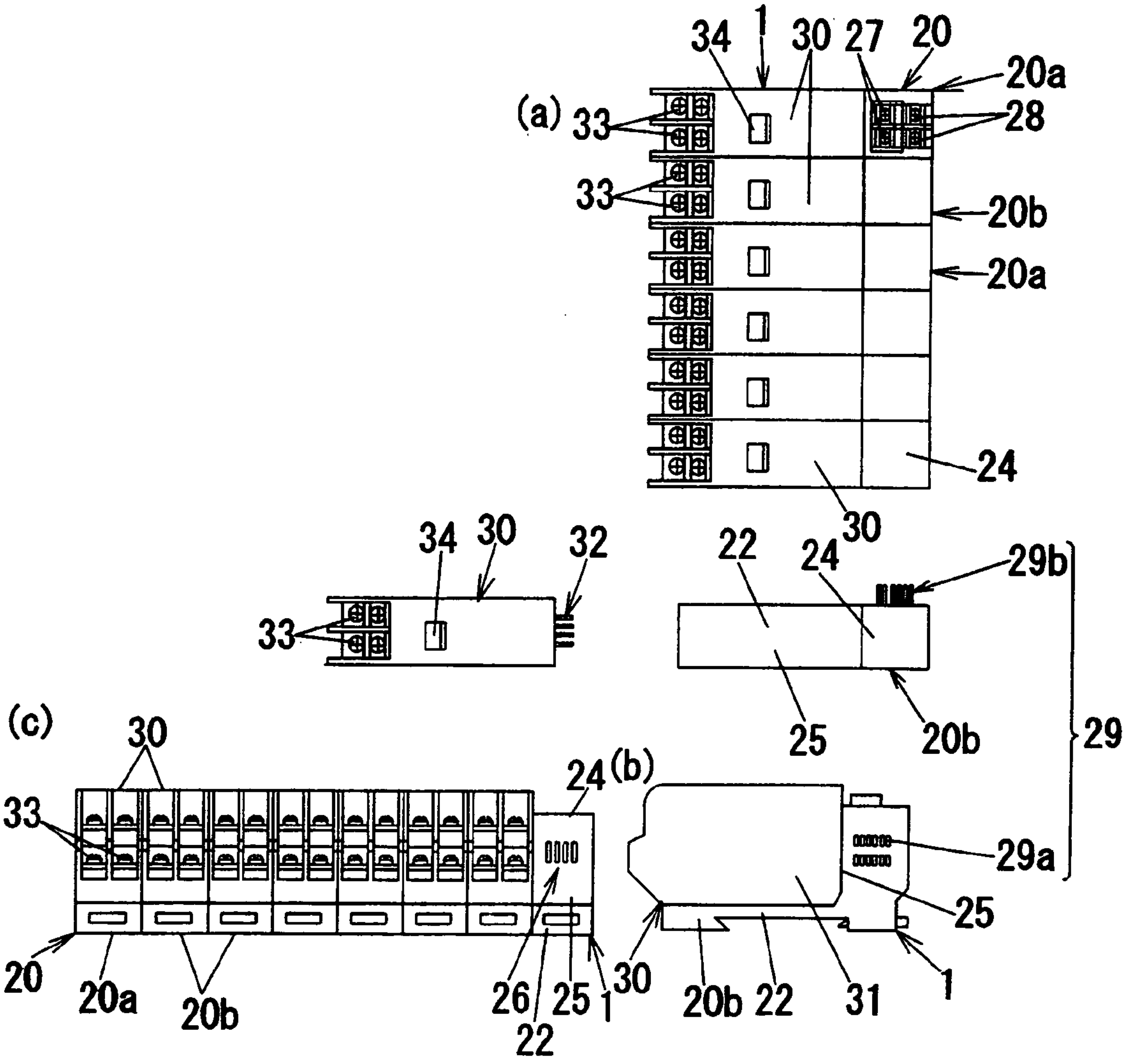
FIG. 10 is a mother device according to a fourth embodiment of the present invention, where FIG. 10(*a*) is a plan view, FIG. 10(*b*) is a side view, and FIG. 10(*c*) is a front view.

In the embodiments described above, the mother device 1 is supplied with the commercial power. However, in the present embodiment, the mother device 1 is supplied with power obtained by stepping down the commercial power with a step-down transformer such as a remote control transformer. That is, since a difference between input voltage and output voltage of the power supply circuit 41 provided in the mother device 1 is small, the size of the power supply circuit 41 can be reduced and the insulating countermeasure for the internal circuits is simplified. Therefore, in the present embodiment, as shown in FIG. 9, the main unit 20 having a shape that the side frame 23 is removed from the main unit 20 described in the first embodiment is used. In brief, the power supply unit 41 is built in the rear frame 24 of the main unit 20. The power supply terminals 27 and the signal terminals 28 have terminal screws and are disposed apart from each other at the ends of the rear frame 24.

In the present embodiment, since the side frame 23 is not provided in the main unit 20, the size of the main unit 20 can be smaller than that of the first embodiment and corresponds to eight unit sizes in the agreed switchboard dimension in the state where the relay units 30 are coupled to the main unit 20. Accordingly, it is possible to save the space, compared with the first embodiment. Other structures and operations are similar to those of the first embodiment.

Fourth Embodiment

In the present embodiment, similarly to the third embodiment, the power obtained by stepping down the commercial power is used as a power source of the mother device 1. In addition, similarly to the second embodiment, the main unit 20 includes the power supply unit 20*a* and the socket units 20*b*. In the second embodiment, the relay units 30 are not coupled to the power supply unit 20*a*. However, in the present embodiment, the power supply unit 20*a* includes relay sockets 26 to which the relay units 30 are coupled and the relay driving circuits 44 are provided in the power supply unit 20*a* as well as the socket units 20*b*. The power supply unit 20*a* and the socket units 20*a* are formed in a shape approximately similar to each other. Since the power supply unit 20*a* includes the power supply circuit 41 and the signal input and output unit 42, the power supply terminals 27 and the signal terminals 28 are provided in the power supply unit 20*a*.

A transmission signal transmitted through the signal lines is a bipolar voltage signal of ±24 V, the voltage supplied to the main unit 20*a* is an AC voltage of 24 V, and the peak voltages of both signals are equal to each other. Accordingly, the insulation countermeasure is sufficient only if both signals are not mixed and thus in the present embodiment, the power supply terminal 27 and the signal terminals 28 are disposed adjacent to each other. Other structures and operations are similar to those of the third embodiment.

The son device 2 described in the first and second embodiment can be used in combination with the mother device 1 described in the other embodiments and the combination of the mother device 1 and the son device 2 can be properly selected.

According to the present invention, since the main unit connected to the signal lines are provided with the relay fitting parts and the relay units having a relay are electrically connected to the main unit when the relay units having relay are fitted to the main unit, the connection work of the relays is not required and the connection work for constructing a system is facilitated. The main unit and the relay units are integrally coupled to each other when the relay units having a relay are fitted to the relay fitting parts of the main unit. Accordingly, in the state where the main unit and the relay units are coupled, they can be treated as one member and the load-side member of the members constituting a system is one member, thereby facilitating the selection of the members for constructing a system.

The present disclosure relates to subject matter contained in Japanese Application No. 2004-188798, filed on Jun. 25, 2004, the contents of which are herein expressly incorporated by reference in its entirety.

What is claimed is:

1. A remote control wiring mechanism in which switching of a relay is remotely controlled by an on-off switch by transmitting a transmission signal including on-off information of the switch through a transmission line, the remote control wiring mechanism comprising:

a main unit having a signal input and output unit connected to the transmission line for transmitting the on-off information of the switch; and a relay unit having a relay, the relay being attachable and detachable from a relay receiving part of the main unit, wherein when the relay is attached to the relay receiving part, the relay is integrally and electrically connected to the main unit, wherein the main unit has a power supply circuit that supplies power for driving the relay, and switches the relay unit having the relay received in the relay receiving part in accordance with the on-off information of the switch received through the signal input and output unit.

2. The remote control wiring mechanism according to claim 1, wherein the remote control wiring mechanism is used for a remote monitoring and control system which comprises a monitoring unit having the switch, a control unit controlling a load, and a transmission unit having a control table in which the monitoring unit corresponds to the control unit by addresses, the transmission unit remotely controls the load by transmitting the transmission signal including the on-off information of the switch from the monitoring unit to the control unit with the control table, the transmission unit is provided in the main unit, and the control table has correspondence between the switch and the relay.

3. The remote control wiring mechanism according to claim 1, wherein the main unit is structured such that a power supply unit having the power supply circuit and a socket unit having the relay receiving part are successively disposed.

4. The remote control wiring mechanism according to claim 1, wherein the power supply unit includes the relay receiving part.

5. The remote control wiring mechanism according to claim 3, wherein the socket unit includes a successively-disposing connector enabling attachment and detachment with another socket unit.

6. The remote control wiring mechanism according to claim 1, wherein the socket unit includes one relay receiving part.

7. The remote control wiring mechanism according to claim 1, wherein the socket unit includes a plurality of relay receiving parts.

8. The remote control wiring mechanism according to claim 1, wherein base bodies of the main unit and the relay unit are configured such that a size of a structure in which the main unit and the relay unit are coupled is a standard switchboard dimension.

9. The remote control wiring mechanism according to claim 2, wherein the main unit is structured such that a power supply unit having the power supply circuit and a socket unit having the relay receiving part are successively disposed.

10. The remote control wiring mechanism according to claim 9, wherein the socket unit includes a successively-disposing connector enabling attachment and detachment with another socket unit.

11. A remote control wiring mechanism in which a relay is remotely controlled by an on-off switch by transmission, along a transmission line, of a transmission signal which includes on-off information of the switch, the remote control wiring mechanism comprising:

a main unit having a signal input and output unit connected to the transmission line for transmitting the on-off information of the switch; and a relay unit including a relay, the relay being attachable and detachable from a relay receiver of the main unit, such that when the relay is attached to the relay receiver, the relay is electrically connected to the main unit, wherein the main unit includes a power supply circuit configured to supply power for driving the relay, and switches the relay unit, having the relay received in the relay receiver, in accordance with the on-off information of the switch, received through the signal input and output unit, the remote control wiring mechanism remotely monitoring and controlling a system comprising a monitoring unit including the switch, a control unit configured to control a load, and the transmission unit having a control table in which the monitoring unit corresponds to the control unit by addresses, the transmission units remotely controlling the load by transmitting the transmission signal, including the on-off information of the switch from the monitoring unit to the control unit in accordance with the control table, the transmission unit being provided in the main unit, and the control table includes a correspondence between the switch and the relay.

12. The remote control wiring mechanism according to claim 11, wherein the main unit is configured such that a power supply unit including the power supply circuit and a socket unit containing the relay receiver are successively provided therein.

13. A remote control wiring mechanism according to claim 11, wherein the power supply unit includes the relay receiver.

14. The remote control wiring mechanism according to claim 12, wherein the socket unit includes a successively disposing connector enabling attachment and detachment of another socket unit.

15. The remote control wiring mechanism according to claim 11, wherein the socket unit includes one relay receiver.

16. The remote control wiring mechanism according to claim 11, wherein the socket unit includes a plurality of relay receivers.

17. The remote control wiring mechanism according to claim 11, wherein base bodies of the main unit and the relay unit are configured such that a size of a structure in which the main unit and the relay unit are coupled complies with a standard switchboard dimension.

* * * * *